(12) United States Patent
Kisters

(10) Patent No.: US 10,003,589 B2
(45) Date of Patent: Jun. 19, 2018

(54) AUTHENTICATION AND/OR IDENTIFICATION METHOD IN A COMMUNICATION NETWORK

(71) Applicant: Friedrich Kisters, Kreuzlingen (CH)

(72) Inventor: Friedrich Kisters, Kreuzlingen (CH)

( * ) Notice: Subject to any disclaimer, the term of this patent is extended or adjusted under 35 U.S.C. 154(b) by 8 days.

(21) Appl. No.: 15/100,030

(22) PCT Filed: Nov. 28, 2014

(86) PCT No.: PCT/EP2014/076016
§ 371 (c)(1),
(2) Date: May 27, 2016

(87) PCT Pub. No.: WO2015/079045
PCT Pub. Date: Jun. 4, 2015

(65) Prior Publication Data
US 2017/0034144 A1    Feb. 2, 2017

(30) Foreign Application Priority Data

Nov. 28, 2013    (DE) .................. 10 2013 019 870

(51) Int. Cl.
*H04L 29/06*    (2006.01)
*G06Q 20/38*    (2012.01)
(Continued)

(52) U.S. Cl.
CPC ........... *H04L 63/08* (2013.01); *G06Q 20/385* (2013.01); *G06Q 20/40* (2013.01); *H04L 9/32* (2013.01);
(Continued)

(58) Field of Classification Search
CPC .. G06Q 20/385; G06Q 20/40; H04L 2209/56; H04L 63/0428; H04L 63/06; H04L 63/08; H04L 9/32; H04L 9/3228
See application file for complete search history.

(56) References Cited

U.S. PATENT DOCUMENTS 4,998,279 A    3/1991 Weiss
5,060,263 A    10/1991 Bosen et al.
(Continued)

FOREIGN PATENT DOCUMENTS

DE    102011101711 A1    11/2012
DE    102011085538 A1    5/2013
(Continued)

OTHER PUBLICATIONS

Auther Unknown, "Configuring Authentication Types", Cisco IOS Software Configuration Guilde for Cisco Aironet Access Points, Chapter 11, Retrieved From https://www.cisco.com/c/en/us/td/docs/wireless/access_point/12-3_7_JA/configuration/guide/i1237sc/s37auth.pdf, Published 2012 (Year: 2012).*
(Continued)

*Primary Examiner* — Chau Le
(74) *Attorney, Agent, or Firm* — Roberts, Mlotkowski Safran Cole & Calderon, P.C.

(57) ABSTRACT

The invention relates to a method for authenticating and/or identifying a device, a service, a person and/or money in a communication network, consisting of a first communication device and an additional communication device, for example a central database, between which an authentication query is carried out. Initially, a first key is provided in the communication device, which comprises at least one character sequence consisting of individual or several locally modifiable characters which can be dynamically modified in accordance with a measurable variable or an algorithm which is dependent on the measurable variable, rules and/or instructions in the communication device, between two authentication time points. A second key is also provided in the central database or an additional communication subscriber which comprises a character sequence consisting of centrally modifiable characters and optionally (Continued)

Figure 1:
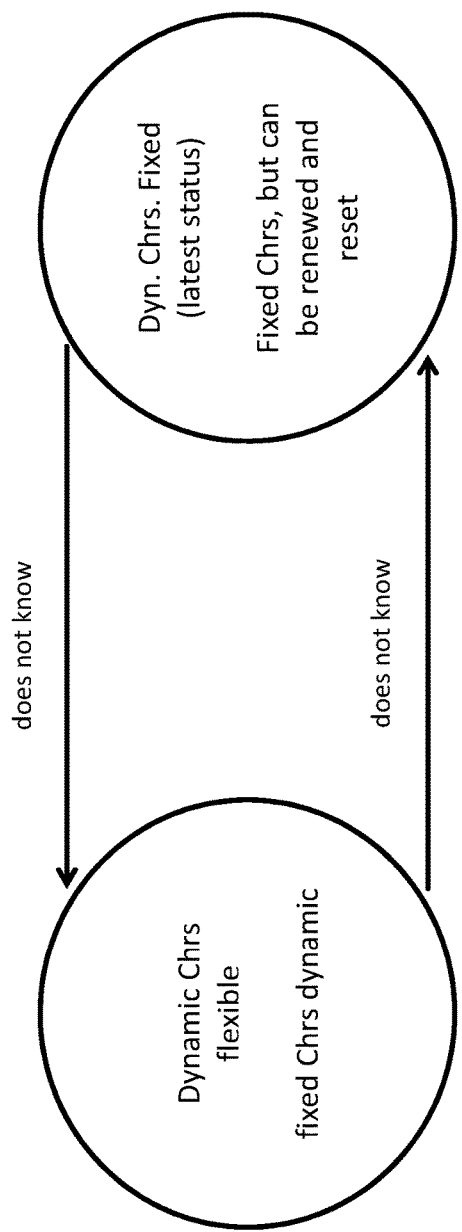

non-modifiable characters. In a further step, a transmission and a comparison of the key stored in the central database and the communication device is carried out.

22 Claims, 4 Drawing Sheets

(51) Int. Cl.
*H04L 9/32* (2006.01)
*G06Q 20/40* (2012.01)

(52) U.S. Cl.
CPC ........ *H04L 9/3228* (2013.01); *H04L 63/0428* (2013.01); *H04L 63/06* (2013.01); *H04L 2209/56* (2013.01)

(56) References Cited

U.S. PATENT DOCUMENTS

| | | | | |
|---|---|---|---|---|
| 5,557,678 | A * | 9/1996 | Ganesan | H04L 9/0822 380/239 |
| 6,134,551 | A * | 10/2000 | Aucsmith | G06F 21/34 |
| 6,173,400 | B1 * | 1/2001 | Perlman | G06F 21/34 380/255 |
| 6,636,973 | B1 | 10/2003 | Novoa et al. | |
| 7,106,845 | B1 | 9/2006 | Zhuk et al. | |
| 7,740,168 | B2 * | 6/2010 | Hammad | G06Q 20/04 235/379 |
| 7,810,165 | B2 * | 10/2010 | Hammad | G06Q 20/085 705/1.1 |
| 8,868,921 | B2 * | 10/2014 | Cramer | H04L 63/0838 713/184 |
| 9,197,408 | B2 * | 11/2015 | Amato | H04L 9/0825 |
| 9,282,088 | B2 * | 3/2016 | Chin | H04L 63/0807 |
| 9,654,467 | B1 * | 5/2017 | Juels | H04L 63/0846 |
| 2002/0166048 | A1 * | 11/2002 | Coulier | H04L 9/3263 713/169 |
| 2003/0037237 | A1 * | 2/2003 | Abgrall | G06F 21/53 713/166 |
| 2006/0031676 | A1 * | 2/2006 | Vantalon | G06Q 10/02 713/176 |
| 2007/0033642 | A1 * | 2/2007 | Ganesan | H04L 63/0428 726/10 |
| 2007/0174472 | A1 * | 7/2007 | Kulakowski | G06F 21/31 709/229 |
| 2007/0260544 | A1 | 11/2007 | Wankmueller | |
| 2010/0257597 | A1 * | 10/2010 | Miyazaki | G06F 21/41 726/8 |
| 2012/0210418 | A1 * | 8/2012 | Kisters | G06F 3/147 726/16 |
| 2013/0054474 | A1 | 2/2013 | Yeager | |
| 2015/0106275 | A1 * | 4/2015 | Wolfs | G06Q 20/20 705/72 |
| 2016/0182495 | A1 * | 6/2016 | Stuntebeck | H04L 63/0846 713/156 |

FOREIGN PATENT DOCUMENTS

| | | |
|---|---|---|
| EP | 0996928 A1 | 6/2004 |
| EP | 1804418 A1 | 7/2007 |
| GB | 2387999 A | 10/2003 |
| WO | 2013/131560 A1 | 3/2012 |
| WO | 2013/116019 A1 | 8/2013 |
| WO | 2013/124499 A1 | 8/2013 |

OTHER PUBLICATIONS

International Search Report of International Application No. PCT/EP2014/076016 dated Apr. 1, 2015.

* cited by examiner

AUTHENTICATION AND/OR IDENTIFICATION METHOD IN A COMMUNICATION NETWORK

The present invention relates to a method for authentication and/or identification of a device, a service, a person and/or funds in a communication network comprising a communication device and a central database, between which an authentication query is conducted.

STATE OF THE ART

Various security methods for performing a data exchange in a network between different network participants are already known. For example, WO 2013/1 16019 A1 describes a security method, in which a so-called dynamic security code cryptographically identifies a mobile communication device of a user on a network. The dynamics of the code consists in exchange of the security element after every authentication. In this method, it relates to dynamically consecutive static security code. The codes themselves remain static and will not change continuously, but overall replaced, i.e. calculated and released newly. Different security questions between the service provider and the user or the device can be performed.

US 2007/0260544 A1 describes a method and a system for dynamic authentication instead of a static PIN changed before each new transaction. In this way, a transaction should be authorized on a transaction network. Thus, it concerns dynamic consecutive static security codes that change only in the case of a transaction and allow a one-time use.

EP 1804418 A1 describes a method that uses a dynamic password, in which a key is used which is generated by an algorithm. Here an initialization is stored in a communication memory card. Here too, the dynamic code is described as a one-time usable code that is dynamically generated for each authentication. The code itself does not change thereby, but is newly calculated and replaced in each case. Therefore, the code is generated dynamically, but otherwise static, as it does not run through the change-process due to recalculation.

U.S. Pat. No. 7,106,845 B1 discloses a security system with different security levels, which can be selected user-specific. A stage can thereby set an algorithm, which changes certain values, wherein the algorithm is known to the users. For example, the algorithm comprises a string that includes, for example, the time or date. A time-dependent code would change this in the same way. Another security level sends a random part to the user (for example, via a mobile phone). Here, a user profile is stored in a database. The dynamic code is calculated in this method on dynamic factors for authentication, but is then statically and therefore only be used once. Again, the code is indeed generated dynamically, but then remains static, because it no longer runs through the change process after its generation, but must be generated newly in each case.

There are methods for producing a "digital financial means" or a digital banknote that can be used for payment. Such a method is described, for example, in WO 2013/131560, wherein initially the physical and/or numerical parameters of an existing bill are collected and then transferred via algorithms in electronic form.

In addition, WO 2013/124499 A1 describes a method to carry out transactions with digital notes, in which the method provides for identification, validation and authorization for the digital banknote.

Many well-known security procedures see rigid security questions before, such as the request for passwords or PIN numbers. There are methods that work with a dynamic code which changes periodically or in accordance with an algorithm, whose generation is only dynamic. After the dynamic generation the code remains static and can therefore be applied only once. It is therefore recalculated again with any future authentication. Such methods can be overcome by an attacker if he gets illegal access to the appropriate database or algorithm. Biometric features are therefore often used for identification, but are vulnerable to counterfeiting and copying.

For instance, EP 0 996 928 D1 describes an authentication method, in which the code comprises a random part and a non-random part (e.g. Identification Number). Both the random and the non-random part of the code are static, and the code does not change further statically. The use of a random code should increase security. U.S. Pat. No. 4,998,279 A also describes a similar procedure, which describes a static code comprising dynamic variables (e.g. a date or time). A dynamic change in these variables that cannot be predicted is not shown in this publication.

DE 10 201 1 101 711 A1 describes a method of authentication, wherein a static component and a dynamic component are provided. For forming the dynamic component a formation rule is specified. In one process step, an authentication identifier is generated, in which the authentication information of the static component, the formation rule for determining the dynamic components as well as a state variable are processed in the form of a state value. In the case of state variable, it can, for example, relate to time. Again, there is no individual local parameter to form a dynamic, unpredictable component.

DE 10 201 1 085 538 A1 discloses a method in which a string has a pre-defined character set. With random means at least one character from the predefined character set is chosen to replace this character. Several characters can be selected from the predefined character set of the random number generator. Then the selected character or the characters are displayed on a display device. In a further step, a third string is received. Finally, it is checked whether the third character string coincides with the second string.

U.S. Pat. No. 6,636,973 B1 describes a method, in which a dynamically changeable user password is used for identification in a computer network. First, a biometric feature of the user is detected and converted into a code. This code is associated with a user password, which will be changed when logging into the network. The newly created password is stored in a user database. The dynamic change therefore occurs when the user logs in the network. Transmitting the dynamically changing code and a cross-check is not provided.

These procedures do not provide sufficient security, when an attacker gains access to a local or central communication device, e.g. a server to misuse services, such as financial transactions. A security system that resists unauthorized access to the central or local database and can also be notionally consulted for authorization of a person, a device, but also of services or funds would be desirable.

SUMMARY OF THE INVENTION

Against this background, it is an object of the present invention to provide an improved method for authentication and/or identification of a device, a service, a person and/or resources in a communication network, in which the verification is based on the application of non-predictable dynamic components.

This object is achieved by a method of the invention described herein.

Said methods are suitable for authentication and/or identification of a device, a service, a person and/or financial resources. Generally, concrete objects, persons, services of an Internet Service Provider (e.g., financial services, Internet transactions, capture media services) or financial resources can be included by the said method. This method starts from a communication network (e.g. a public wired or wireless network, such as the Internet or an internal network or intranet), which consists of one or more subscribers. There are local participants and/or a central database, in which Information available for the device, the service, the person and/or the financial resources of the participants is stored. However, the method also functions among the participants, wherein the "central database" corresponds to one or more participants. The inventive method allows the authentication and/or identification of a subscriber, and/or his device and can also identify or authenticate a means of payment or a service that the subscriber wishes to use. The term "central database" should be broadly understood in the context of the present invention and relate not only to the database of a data processing unit. The term includes, for example, a data processing unit, a hardware-based server or another stationary, mobile or portable communication device.

To be able to use a particular service of a service provider, first the person and/or the unit must be identified, so that the user or the device can access the service. Linked to this, for example, is a payment system that allows the user to pay the claimed service safely and without cash. This can, for example, take place via a credit amount encrypted internally in the device or an internally stored "digital bill", which is completely or partially deleted or made invalid after a successful transaction, or is reassigned.

As a safety-related element, novel "keys" are used in the said method, which are assigned to each network participant and/or one or more central database(s). The "keys" are made of strings or characters that are either changeable or can be static, wherein one partner does not either know the exact conditions of dynamic characters or strings of the other or only partially. A string is composed of several characters, whereby the characters may be arranged in series or preferably branched to one another. Further, multiple strings can be networked with one another, whereby a predetermined arrangement of strings in the key can describe a separate safety feature, besides variability of individual characters or the entire strings.

An inventively constructed key can be temporarily stored in a central database to identify the participants in the communication network or their equipment and to authorize the use of services. The single keys comprise at least one sequence of numbers consisting of at least 5, 10, 20, 50, 70, 100, 200 or more characters. Preferably, multiple strings with changeable and/or unchangeable characters can be provided. In this case, the key can contain persons, services, equipment-specific information, or parameters, for example, the identification number of a user, the network number of a device, a date, physical parameters, a monetary value or a sum of the digits or checksums of these parameters, which facilitates an unambiguous identification or assigning the person or device in the communication network.

The invention is essentially based on two databases, which for the sake of clarity are referred to as local and central database. The local database is, for example, stored in a communication device such as a portable PC, a tablet or a Smartphone. The term "local" means, for example, a mobile or portable communication device, while the term "central" a data processing device (server) or a further mobile or portable communication device. The terms "local" or "central" therefore serve only the differentiation/distinction.

A special feature of the said invention lies in the fact that at least one key is stored in both the communication device as well as in the central database, which consists of at least a character string and each string in the respective key comprises of changeable and/or unchangeable characters, wherein the change of characters is done either locally, centrally and/or in both places. It may preferably be foreseen that the changeable characters may change locally, only centrally or at both places, while the unchangeable characters can be changed, for example, only in the central database, but not in the communication device. The terms "changeable" or "unchangeable" are, therefore, seen always from the viewpoint of the respective database and authentication timing. Certain characters remain unchangeable during or between two authentication timings, however changed when authenticating again, replaced, for example, by other characters or reset to its original state.

In a preferred embodiment, the changeable characters are changed dynamically, i.e. either locally or centrally dynamically changeable. In the case of locally dynamically changeable characters, the central database does not "know" on which grounds the changes are based on. Conversely, dynamic central changes are unknown to the local database in the communication device, such as a mobile phone or Smartphone.

Dynamic changes, which run, for example, locally on the communication device are not predictable by the central database and, therefore, cannot be cracked even by a hacker.

Conversely, dynamic changes in the central database are only known by the central database because the relevant rules or instructions are not stored in the local communication device. There are static characters, i.e. characters that do not change between two authentication time-points and can change only at an authentication query (but do not have to change, for example, by resetting to its original condition or replace with a newly generated character). The newly generated character can preferably originate dynamically from the changeable string. Numbers of the changeable string would then be indirectly part of the static string. For example, it may be provided that the central database contains dynamically changeable characters that are constantly changing due to only locally available, but not predictable factors (without having to identify these changes to the communication device). During authentication certain characters (a date or time, for example, or any example) could also serve as a basis for static character, which are transmitted when querying by the central database to the communication device. In addition, identity determining characters (=unique ID), a password or a code can be part of the string that does not change.

For the changeable characters, a distinction is made between the dynamically changeable characters that change either locally or centrally and characters, which change only in case of an authentication query, and, if necessary, other characters that never change. The unchangeable characters are characters that at least between two authentication queries remain static or preserved.

Thus, the whole strings or individual characters can be changed within a string, wherein the changeable characters or string variable are not known to the respective communication subscriber. Conversely, the unchangeable characters are not necessarily known to the other communication participants. Should there be, for example, characters that change only locally in the communication device, then the central database is not aware of which characters change in the communication device locally and on what influences this change is based. It also does not recognize the compositions of this and what is the cause of these changes. The appropriate rules, which determine the nature and extent of the changes in the string, would, in this case, be known only to the communication device, but not to the central database. Depending on the application, this can, of course, also apply to the reverse situation, i.e. the changes of central changeable characters or an entire string of the central database are only known to the latter, but not the communication device. Because these changes are stored after each authentication in the other database as a new state, it is not possible to register with a previously made copy that still reflects the previous level. On the other hand, it is not possible to copy the new status to the changing database, because it does not remain static, but changed further continuously. Misuse is therefore detected latest when the next application of the correct string takes place. If this application has already taken place, the improper use is immediately detected.

According to the invention, the individual or more locally changeable characters change as a function of a measurable variable, such as a physical or chemical detectable size. For this purpose, preferably sensors or measuring devices are used, which determine a state variable inside or outside of the communication device. An example is the measurement of the temperature inside or the outside temperature. Based on the measured variable as determined, the changing characters or string can be altered in an unpredictable manner in a further step. The determination of a measured value thus provides a specific numerical value, which is used for the dynamic change of the security code. In addition, it is also possible that the determined measured variable influences an existing algorithm, a control and/or an instruction, either in the communication device or in the central database. For example, external or internal influences are conceivable that lead to the change in the dynamic code. External or internal influences are preferably based on physical or chemical properties or processes. An internal impact includes, for example, the battery level, the processor temperature, a timer, the time of the last authentication, a difference between two values, a pulse or a parameter-dependent algorithm, a special configuration (e.g. a version of an operating system, loaded mobile software packages (APPs), used apps or open applications). In addition, the influences can encompass an individual modification (e.g. an additional SD card, a RAM upgrade) or application-specific or user-dependent characteristics (e.g. typical processor utilization, operating temperature). An external influence includes, for example a local, external temperature change, a pressure change, the number or pulse intensity of vibrations, a change in position of a moving subscriber, typical behavioural or operating characteristics of a user (e.g. number of parallel contacts with other users, contacts per period, which contacts=contact group, which can vary significantly depending on the time of day), frequency of use, also depending on the time/a period, speech volume, other preferences, such as favourite music, favourite apps, favourite words and word abbreviation. A rule includes, for example, the use of a basic calculation rule, counting down or counting up a value or a number, a general algorithm or commuting within limits and shifting the numerical position. A statement includes, for example, an enlargement or reduction of a credit amount by a certain value, using up a credit amount, a fixed change in a sequence of numbers or assigning a value. For example, the string can include a sum of money, which is completely used as payment means, where the sequence of numbers is partially or totally cancelled after the transaction.

Said method requires in a variant a stationary server and a mobile communication device, such as a computer, a notebook, a mobile phone, a tablet or a Smartphone, and a central database, wherein an authentication query is performed between the communication device and the central database. As a rule, the central database is located on a stationary server system. However, filing in another communication device or a server (stationary or mobile) is possible. As part of the authentication query, the device, the service, the person and/or the fund is authenticated and/or identified.

In a first step, a first key in the communication device is first provided that includes at least one locally stored string. The term "local" in this case refers to the stored data in the communication device while the term "central" refers to stored data in a non-local database. The string locally stored In the communication device consists of preferably single or multiple, locally changeable characters, which can be dynamically changed depending upon a physical quantity, i.e. an internal or external influence, of an algorithm dependent of a measured variable, rule and/or instructions in the communication device between two authentication time-points. This dynamic, progressive change takes place in an embodiment only in the characters or character string of the communication device. The central database does not "know" these changes in the characters or string of the communication device. So the central database also does not know the rule or influences underlying these changes.

The dynamic variability involves the replacement, the deletion, the amendment or other changes of one or more characters or entire sequences. Preferably, for example, changeable characters can be fast changed in a string at different speeds. For example, a rule can foresee that a numerical value can be changed either upward or downward in accordance with a time clock. Other characters in the string can foresee faster changes in another time clock, for example, a counting up or down, in split seconds, before the pre-defined characters or strings. This delay or acceleration of the time clock of dynamic change (e.g. time sequence, frequency of changes, interval) may again be influenced by locally occurring physical or chemical parameters, which may be part of the locally stored dynamic string and thus establish a correlation to the capacity for change in other dynamic characters. The local factor can, therefore, be directly related to the capacity for change.

The locally stored string in the key of the communication device further consists of an embodiment of single or multiple locally unchangeable characters in this or any other locally stored string, which remain static between two authentication time-points in the communication device. Thus, we have the situation that the key consists of locally changeable characters and locally unchangeable characters. The locally changeable characters are, as explained above, changed according to a locally available measured value, a stored rule or instruction, while the unchangeable character is preserved between two authentication time points, i.e., the time points, in which a query and a balance takes place between the communication device and the central database in the communication network.

According to the invention, a second key is provided which is stored in the central database. Even this second key includes a string that consists of centrally changeable and unchangeable central characters or strings. The second key stored in the central database consists of single or multiple characters that correspond to those of locally changeable characters of the communication device of the last authentication time point. The central unchangeable characters would, therefore, correspond, at the query time, to the state of locally changeable characters at the last query. In other words, the local changeable characters or the character string of the communication device at the time of last authentication are transmitted to the central database and update the corresponding central unchangeable characters or string in the central database. These characters are not changed any more, preferably in the central database till the next authentication query and remain static. The centrally changeable characters would in turn correspond to the locally unchangeable characters. Through the comparison with the last state of the changeable characters it can be determined whether the transmitted string matches with the character string stored, that is, whether there is a unique authentication. In case of wrongful authentication, the string between two authentication time-points would have been used, so that two different users must exist under the same identity, of which one has been authenticated illegally.

Of course, it can also be provided that the central unchangeable (or the locally unchangeable) characters change periodically (and thus become changeable characters) or are not changed between two query time-points. Even changeable characters can be transformed into unchangeable characters. Insofar the said key is flexible. Prerequisite is the composition of dynamic and static characters. Due to this composition the strings are in a position to mutually check and ensure the integrity of authentication.

Preferably, however, the locally unchangeable characters or the string are centrally changed by the central database during an authentication query. If these characters were unchanged during a subsequent authentication query, then it could be quickly determined that the communication device is used by an unauthorized person.

The second key of the central database preferably comprises of single or multiple central changeable characters in this or in any other string that match the locally unchangeable characters or character string of the communication device of the last authentication time point. In an authentication query, the central unchangeable characters of the central database are transferred to the communication device and update the corresponding locally changeable characters or string. If these characters have been at least partially modified or manipulated, it would mean an unauthorized access attempt by an ineligible entity. Only the central database "knows" the central changeable characters that are stored in the key. Conversely, only the communication device (i.e., the local database) "knows" the locally changeable characters. The central unchangeable characters are stored in the database and meet the characters of the last authentication time-point.

In a further process step, a transmitting and a comparison of the key stored on the communication device takes place with the key stored in the central database during the last authentication time. According to the invention, there is a positive authentication and/or identification of the device, the service, the person and/or the financial resources at the time of authentication when at least the following criteria are met:

i) at least partial conformity of the locally unchangeable characters or string in the key of the communication device with the corresponding locally changeable characters or string in the last key the central database, ii) at least partial mismatch of locally changeable characters or string in the key of the communication device with the corresponding centrally unchangeable characters or string in the key of the central database.

Preferably, a complete conformity or mismatch is set. According to the invention, the locally changeable characters or string between two authentication time-points can be changed only in the communication device, but not in the central database and the centrally changeable characters or string can be changed only in the central database, but not in the communication device. According to the invention, it is further provided that in case of successful authentication the locally unchangeable characters or string in the key of the central database are reset or changed. Thus, the unchangeable characters or string, locally stored in the communication device, correspond to centrally changeable characters or string in the key of the central database, when the comparison has taken place.

By resetting or changing the central changeable (=locally unchangeable) characters or string in the key of the central database, the communication device receives a further developed "character set" at the time of authentication in this embodiment. In this case, this centrally changeable character set may also contain new information, such as an updated amount of money, a date, or the difference between two query time-points. According to the invention, either single characters, full strings or complete keys can be transferred between the central database and the communication device (and vice versa) This new record is now changing between the authentication time-points, dynamically depending on the local factors, such as the ambient temperature, which effectively prevents a copy of the same.

By combining locally changeable and locally unchangeable characters or centrally changeable or unchangeable characters (or strings) in the central database, a high level of security for authentication and/or identification of a unit, a service, a person or financial resources is achieved. Should there be an unauthorized access to the central database, he would not be in possession of the rules, which determine the change of characters in the local database, as these rules are affected or supplemented by locally varying measured values. Thus, during authentication neither a fake central database, nor a fake local database can be simulated. A forger does not know the circumstances, factors and particular local dynamic values that can influence the dynamic changes. Even if the forger had gained simultaneous access to the central and local database, he would not be able to successfully authenticate and would be revealed at the latest in a query of the legitimate user, because the changes caused by him at the central database (triggered by the authentication) would no more match those of the local database of the legal user. If this fake security is associated with a biometric feature, then a forger loses all possibilities to feign the identity of another person unnoticed.

The method also works naturally in reverse direction, i.e., dynamically changeable characters or string is stored in the central database. In addition, the strings can contain characters that dynamically change only in the communication device and/or characters that can be changed dynamically only in the central database. Thus, the said dynamics can be used in various stages (local only, only centrally or locally-central).

If one implements the principles, as described above, for the communication device to the central database, then the key of the central database comprises the dynamically changeable characters. A further means of enhancing the security level are the dynamic characters, while the static ones are usually used for easier recognition. In a variant of the method it can even be omitted.

Said method comprises the following steps:

Providing a first key in the central database, which at least comprises one string, consisting of single or multiple central changeable characters that change dynamically depending on a measurable variable, an algorithm dependent of the measurable size, rule and/or instructions in the central database between two authentication time-points, single or multiple centrally unchangeable characters in this or any other centrally stored string that remain static in the central database between two authentication time-points, Provision of a second key in the communication device comprising a string, consisting of single or multiple locally changeable characters in this or in a further string that match the centrally unchangeable characters or string of the central database of the last authentication time point, single or multiple locally unchangeable characters that correspond to those of those centrally changeable characters or string of the central database of the latest authentication timing, Transfer and comparison of the key stored in the central database and the communication device.

A positive authentication and/or identification of the device, the service, the person and/or the financial resources takes place during authentication when at least the following criteria are met:

i. at least partially match of the central unchangeable characters or string in the key of the central database with the corresponding locally modifiable characters or string in the key of the communication device, ii. at least partial mismatch of centrally changeable characters or string in the key of the central database with the corresponding locally unchangeable characters or string in the last key of the communication device, wherein the centrally changeable characters or string can be changed between two authentication time points only in the central database, but not in the communication device and the locally changeable characters or string or only in the communication device but not in the central database.

Preferably it can be foreseen that the changeable characters during an authentication are converted into unchangeable, static characters and then integrated into or be attached to the string, which has to be transmitted to the partner database. In this case, the static string would contain the transmitted changeable characters of the last authentication time-point.

It is preferably provided with a further embodiment variant, that the above principles of the first local key of the communication device and the second central key of the central database are accordingly implemented for the first central key of the central database and the second local key of the communication device. This means that (in addition to or alternatively) the central database includes dynamically changeable characters or a string that can be changed continuously due to the influences as described above. The central variable key would, therefore, always be dynamically changeable and not only between two authentication time-points.

According to the invention it is further possible that the locally or centrally stored key in the communication device comprises of several strings, a string is composed entirely of changeable characters, while the other string is composed only of unchangeable characters and a third string that holds the state of the changeable characters of the other database at the time of the last authentication. Alternatively a string can also be provided, in which single or multiple characters are changeable, while other characters cannot be changed in this string. Alternatively, static characters can be completely dispensed with and only the dynamic characters are used for authentication. Various combinations are also conceivable.

In a preferred embodiment, the locally unchangeable characters or string in the key of the communication device and/or the central database are reset or changed for a successful authentication and then transferred to the communication device or database. Here, the transmitted characters or strings in the communication device or the central database are completely or partially replaced or deleted as a function of the transmission direction.

In a further preferred embodiment, the communication device and/or the central database can also include a plurality of keys with changeable and/or unchangeable number sequences to carry out a "cross-checkinghedging". This means that a resetting or a change in the static characters can be carried out both locally and centrally. Conversely, the central database include dynamic characters or character sequences that vary continuously between two authentication time-points, without that the communication device or the local database "knows" this rule or influencing factors of this rule. The same system can also be applied to the central database. So that all the possibilities and combinations are covered for implementing said security procedures both on the communication device as well as in the central database. Of course, this method also works between two communication devices or between two central databases. The key can be stored on stationary, mobile or portable devices and can get an assignment as "local" or "central" key. In this case, however, it is important that the new dynamic changes in the respective are not known to other partners.

In a preferred embodiment, the first key in the communication device and the second key in the central database includes further identity-determining characters or a string, with which the device, the service, the person or the financial resources can be/are clearly identified, wherein an identification at the authentication time is effected such that the identity or character string/s stored in the communication device match with the identity or character string/s stored in the central database.

Alternatively, in a variant of the method, the partial conformity of the stored identity characters or string(s) can be completely dispensed with a double handshake, as described later, so that in the keys (DSC) only dynamically changeable characters are used. In a variant, it would be sufficient that, for example, only the energy charge level or another measured value is transmitted as a dynamic code to the other communication subscriber.

Preferably, the changes in the changeable string are time-pulse controlled, motion-dependent, location-dependent, time-dependent, dependent on temperature, vibration-dependent, depending on values and/or carried out by other service-specific requirements. For example, position information via a GPS sensor in the string are stored as code. Furthermore, the timing of the authentication, the communication device at the central database or even the time differences of the last authentication time-points can be stored in the changeable string. Vibration sensors can also provide metrics and form cross sums or average values, leading to a numerical value, which in turn can be stored in the changeable string. In case of a payment system a value-dependent change in the string can also be carried out, for example, the string variable can contain a numeric value for a currency, with which a payment operation can be performed. The difference of the purchased goods or services are then deducted from this numerical value and stored as changed numerical value in the string. Furthermore, it is also possible that in the changeable or unchangeable sequence of numbers, the value of a payment means is fixed. For example, a number code can be used with a "stored" monetary value to make cashless payments. In this case, each code corresponds to a "digital bill". The payback amount in turn would take place via other digital bills, in which the corresponding ad valorem strings are transmitted. In addition, the currency can be automatically converted and adjusted according to geographical location.

Said central database may be incorporated in any structure or device. The key of the communication device is preferably stored in a local database. Preferably, the keys are coded cryptographically.

Preferably, the said character strings include letters, numbers, signs, illustrations and/or symbols. The figures include, for example, graphics, colour schemes, drawings or patterns, which can be stored as characters or string in the respective key of the central database and the communication device and and can be even assigned to values. Thus, sample or colour schemes can be changed dynamically within the string. The entire string itself can be represented as a pattern and at least partially subjected to dynamic changes in the sense of the present invention.

To rule out a fake or an imitation as far as possible, it is foreseen in a preferred variant that the locally changeable string or characters in the communication device and/or the central database includes characters that can change at different paces. Thus, individual or whole strings can include changing numbers that change in seconds. In addition, individual characters or the entire string can change in minutes or hours, daily or weekly cycle. The corresponding rules or algorithms can be specified by the respective service provider. The rules can also be purely coincidental. It can be preferably foreseen that additionally an algorithm, a control and/or a statement is stored in the communication device and/or the central database, which defines whether and how a number sequence between two authentication time-points changes continuously. Hereby, values as determined in the string and/or values swinging between two limits and/or ascending or descending sequences are defined.

In a preferred embodiment, it is further possible that the changeable string includes the last authentication time, the value of financial resources, a physical value, a positional indication, a date, a time value, a cross-sum and/or a checksum. Further, it can be provided that the time difference between two sampling time-points between the communication device and the central database is stored as a difference time value. Even, the values of the changeable characters can be encrypted to the last authentication timepoint with an algorithm. This algorithm can, for example, build on the dynamic factors mentioned above and thus, lead to individual encrypted strings in the central database and/or the local database. In an authentication query, the date and/or time can also be transferred, so that the time of the last authentication for both the communication device and/or in the central database is part of the string.

Resetting or changing the locally unchangeable characters of the central database or the centrally unchangeable characters in the communication device is preferably performed during authentication using a centrally or locally stored rule, an instruction, depending on values, an algorithm and/or by other service-specific requirements. Further, it can be provided in a preferred variant that the local key of the communication device is partially or completely deleted or cancelled after successful transfer to the central database.

Preferably, the locally stored string comprises an identity determining string, with which the device, the service, the person and/or the financial resources can be clearly identified. This identity-determining string can be supplemented by a further new string at the time of authentication query, via which a thereof independent device, a service, a person or financial resources can be identified. For example, a monetary value, in this way, can be assigned to a particular person, if the latter logs in a system at the time of authentication. Thus, functions, services or financial resources can be allocated to a person in a hierarchical manner. It is also possible to detect families and other personnel groups hierarchically and assign, for example, a national identity.

Said method prevents a copy of the data of the local communication device and/or the central database being used illegally. The dynamic, changeable characters are changed, depending on the version, either on the central database and/or communication device, whereby different characters or strings may be provided that change at the respective equipment, whereby safety is further enhanced. As a rule, the communication device will contain a database, in which the key is stored.

Only at the time of authentication, the altered characters or string/s are transmitted to the central database within this string or a further, separate string and compared there with the last stored characters or string/s. The locally unchangeable characters are known only to the central database. Should a change of these characters or strings, for example, be done on the local database, this would indicate an unauthorized access or tampering. The unchangeable characters or string can, in principle, remain static. However, safety is further increased when the locally unchangeable characters are reset and/or be completely or partially replaced by the central database after each read-out operation. As already noted above, it is also possible that the centrally unchangeable characters are reset, changed or remain unchanged by the communication device after a read-out method for authentication time.

In a preferred variant, it can be further provided that the unchangeable characters or string can be locally processed as changeable characters, i.e. changed, replaced or deleted but is then reset and/or changed again at the time of authentication by the central database.

Further, transfers of an earlier authentication timing of unchangeable characters, which have been changed unknowingly by the local communication device or its database is stored centrally and possibly additionally compared with the characters or character string transferred anew, to ensure that the re-transmitted characters or string cannot be a copy of an earlier state. Alternatively, the unchangeable characters at every query timing can be replaced via an algorithm in the central database with the new unchangeable characters. In a preferred variant, it is provided that these characters or string remain preserved until the next query to the central database. For every query, local changes of these characters are overwritten by new entries in the central database. The combination of changeable/unchangeable characters or string allows a maximum possible flexibility also with regard to assigning a value within a specified string. For example, a date, an indication of value, physical parameters or other information may be incorporated into the string. Depending on the type, this information can be integrated in the locally changeable or locally unchangeable or in the centrally changeable or unchangeable characters or strings. Consequently, the string can change the built-in their value, for example, when incoming payments or outgoing payments are assigned to a user, even without having to identify or register the same.

In one variant, it may be provided that the static characters of the central database (or analogously to the communication device) behave differently during an authentication query. So the characters can either remain unchanged, can be reset or replaced by a new character, so that the static characters can be divided into different sub-groups. This is explained by way of an example:

A locally changeable string consists of: 1 2 3 4 5 6 7, where the digits are 1, 3 and 6 are used during authentication. A centrally changeable string comprises: 5 2 7 3 4 0 9, wherein the digits 2, 4 and 9 are used for authentication. During an authentication, now a new code is generated, consisting of the dynamically changeable numbers of the communication device and the central database, i.e. 1 2 3 4 6 9. This string is stored as unchangeable static sequences between two authentication queries in the central database and the local communication device. The dynamically changeable characters would change continuously while these static characters remain unchanged. If, for example, the communication device is used unlawfully, then during the next query the unchangeable static string would be replaced by a new one, again composed of dynamic characters of the communication device and dynamic characters of the central database. The legitimate user would immediately notice in his authentication attempt that someone has unlawfully carried out a query, since he can no longer authenticate—the key has changed in the meantime in the central database. The security is formed in this case by the fact that only the central database "knows" the static characters of the last authentication time-point. A subsequent authentication attempt would be detected immediately.

In order to prevent the use of a stolen communication device, preferably biometric features of the subscriber are available. These include, for example, fingerprints, the iris or vein structure, the voice or a particular person-specific behaviour. In addition, there may also be object-specific characteristics, in which it is possible to identify a device using specific characteristics. For example, cross sums or average values of measured physical parameters can be formed. Thus, for example, the sum of the measured temperatures, the cross sum of the most recent calls or the sum of vibrations determined by a vibration sensor could be used. The numerical values formed therein can replace the centrally stored string partially or completely. Further, maximum counterfeit-proof static and dynamic security elements, e.g., a crackle pattern can be used, if they are assigned to a biometric security feature of the user.

The rules presented here may also be combined or interchanged, such that the changeable characters do not change locally between two authentication time-points, but change centrally. In addition, several keys may be provided, in which the combination between changeable characters and unchangeable characters are executed as many times and in various combinations. Further, it is possible that the formerly changeable characters are transferred in unchangeable characters and vice versa. Finally, the authentication queries as described here can also be carried out several times at different levels, whereby additional security arises.

As described above, there are unchangeable characters which are known or unknown to the partner database. A "partner database" refers to either the central database, or the local database in the communication device.

Preferably, the unchangeable characters can be divided into two subgroups:
1. Character, which can be changed at any time. In this case, the partner database is informed of their immutability.
2. Characters which can be changed by the partner database, because it is not informed of their immutability.

The second group, which is not known as unchangeable by the partner database, can be changed by the latter without the knowledge of their immutability and as part of the dynamic change in the string. In this case, the characters of this subgroup are divided into three subgroups characters:
a. Characters that will be changed back to the original value based on an authentication query.
b. Characters which are assigned to a new value during an authentication query, wherein a value modified on the partner database can be used for the calculation of the new value, as well as other factors, such as those generally used for dynamic change of the character string.
c. Characters, which accept the change carried out on the partnership database during authentication, and thus merge into the latter.

Once unchangeable characters are unknowingly subjected to the dynamic method of change on the partner database, it is advisable to attach the supplied string to the original string immediately after the last authentication or integrated into this before it is changed dynamically. This procedure allows a sharp comparison instead of a fuzzy comparison and does not pose a security risk because the originally issued string remains only part of the entire string, which also effectively protects itself against any type of copying by the dynamic method of change integrated in it.

In order to completely exclude the authentication attempts with forged copies or counterfeits of dynamic string, in a preferred embodiment the authentication process is supplemented by a pre-authentication. This can be triggered in the event of an authentication request to the requesting database of the partner database, which leads to immediate change in dynamic code in the original inquiring database, as also in the partner database. However, this is not the case for a forgery or copy, as there is no connection to the original partner database. Information exchange automatically takes place to the original, apparently inquiring database and not to the fake one. This leads to a change of string or individual characters, whereby the forgery becomes outdated and thus is worthless. No successful authentication attempt can be carried out using a fake string. Alternatively, based on pre-authentication, static strings can be completely dispensed with.

Accordingly, the contact is sought for the last authenticated partner database, wherein a fake and copy is already recognized through pre-authentication at the first, actual authentication attempt. Should the last authenticated partner database be inaccessible at the time of pre-authentication, then a corresponding warning is issued and the authentication method is either not, or only apparently conducted, so as to ascertain the location of the counterfeiter. A request by an inaccessible database is sufficient to determine a possible forgery attack.

In a preferred variant, the present invention includes a method for authentication and/or identification of a device, a service, a person and/or financial resources in a communication network consisting of a first communication device and a further communication device, like a central server.

Between the first communication device and the further communication device, e.g., the central server, an authentication query is conducted. In this variant, initially a first key is provided in the communication device, which comprises at least one string, consisting of single or multiple locally changeable characters that change dynamically depending on a variable that can be measured technical means, on an algorithm contingent on this, on a rule and/or a statement in the communication device between two authentication time-points. In the case of the key it relates to a code, a value or a string. Preferably, the key can additionally include one or more locally unchangeable characters in this or any other locally stored string, which remain static between two authentication time-points in the communication device.

Then, this first key of the communication device that corresponds to the dynamic code is transmitted to the central server via a communication channel. Preferably, the transmission is encrypted. From the central server, a second key (central server key) is provided, wherein the key includes a string, consisting of single or multiple centrally changeable characters that change dynamically depending on a measurable variable, on an algorithm contingent on this, on a rule and/or a statement in the communication device between two authentication time-points. In a preferred embodiment, the second key may include in addition one or more central unchangeable characters in this or any other locally stored string, which remain static between two authentication time-points in the communication device.

The measured variable (e.g. temperature, air pressure, GPS data, charging state of battery), which is used to change the dynamic characters, is determined preferably on the respective device, which houses the dynamic code (DSC), i.e., either on the mobile device, on a central server or on the mobile device of a further subscriber with appropriate technical facilities. Here, for example, a temperature measuring device, an air-pressure measuring device, a GPS tracking device, a charge sensor, optics, etc. are used.

In a further step, the first key received from the central server of the communication device and the second key of the central server are transmitted via a communication channel to the communication device. The dynamic code transferred by the central server thus comprises the key of the first communication device and the key of the central database server. In the communication device it is then checked whether the first key of the communication device obtained from the central server matches with the previously transmitted key. If the check is positive, then the first key of the communication device obtained from the central server and the second key of the central server are again transmitted to the central server via a communication channel. It is checked whether the first key of the communication device and the second central key of the central server match with the key transmitted in the second step. If this query is positive, then the first key of the communication device and the second key of the central server are sent along with an action code via a communication channel back to the communication device. Each action code is assigned to a particular action. Based on the action code, the authenticated user can perform the desired action, such as carry out a transfer or book a service. If required, the confirmation can be used via a further safety feature, such as a biometric feature. This preferably runs in the background on the mobile device, so that the user does not need to make any complicated setting. It can be foreseen that the user once again confirms the action consciously.

The transfer of the characters or character string can be carried out via a network or manually. For example, a string can be manually read by a scanner or in an input device input (via a numeric keypad or speech mechanism, for example).

Together with the dynamic security code, further data or data packets can be transmitted. It is provided in a variant that individual data fragments—like a puzzle—are stored in different locations, which further increases the safety. The dynamic characters can be converted into static characters or vice versa.

The dynamic security code (DSC) as presented her thus uses local parameters that are constantly changing, for example, in a mobile device. In a mobile phone, the battery level can be used as a local factor. The currently valid value can never be calculated in advance, even if the algorithm is known as such.

The communication network operates preferably encrypted and ensures that a request originates from the authorized person. In a preferred variant, even the security code itself can be encrypted and transmitted via secure communication channels.

The present invention is further illustrated in the following drawings.

WAYS OF CARRYING OUT THE INVENTION AND INDUSTRIAL APPLICABILITY

FIG. 1 shows an application example, in which a local database and a central database are used in a communication network. The local database may be part of a communication device, for example, a mobile phone. The central database can again be stored on a server or another communication device (e.g., mobile device). In the local database, a character string is stored, which comprises a plurality of several dynamic characters. These characters are changed locally and are, therefore, flexible in the local database. In the central database these locally dynamic characters are, however, static, i.e. in the central database, characters of the last authentication query are stored. The local database "knows" the characters that cannot be changed locally in the central database. Besides, there are characters in the local database that cannot be locally changed, whose counterpart is stored in the central database. There, however, they are resettable or changeable in an authentication query as centrally changeable characters. The local database does not know the final status of the locally unchangeable or centrally changeable characters that are stored in the central databank. Should the key of the communication device, for example, be stolen and used for an authentication attempt, then immediately the status of the locally unchangeable or centrally changeable characters that are stored in the central databank and thus the central key would change. An unauthorized user would be detected by the original database in the next query. As regards pre-authentication, an illegal authentication request can be quickly recognized, in which these parallel dynamic changes act on both databases that cannot anticipate a fake.

A comparison of the data of the local database and the central database usually takes place at the time of authentication. Only when the pre-authentication and/or authentication and/or identification have been successful, there is an update of static characters.

Figure 2:
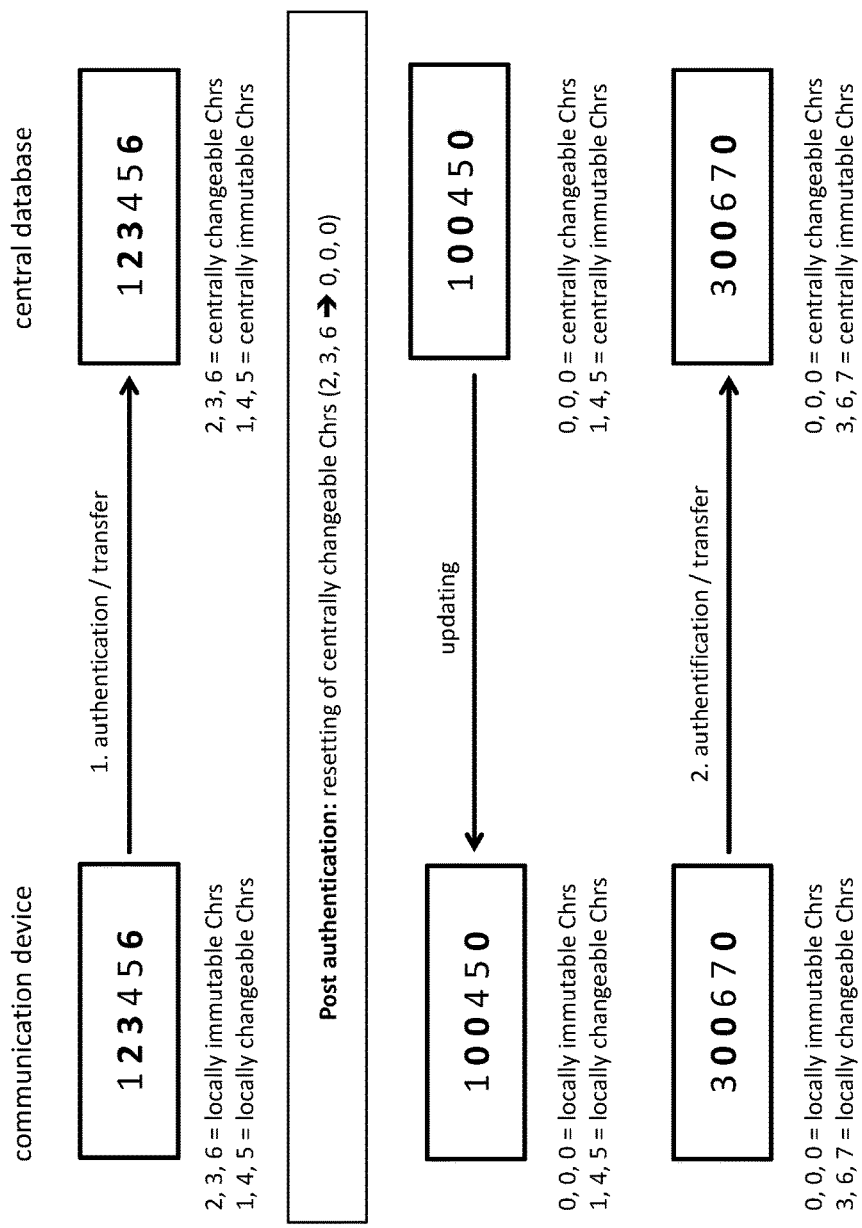

FIG. 2 shows an example of the said method. A communication device includes a key in the form of a string consisting of the numbers 1, 2, 3, 4, 5, 6. The figures, highlighted in bold, of the communication device 2, 3, 6 correspond to locally unchangeable characters, while the numbers 1, 4, 5 correspond to locally changeable characters. The locally changeable characters would vary constantly in a dynamic manner according to the rules or instructions as specified in the communication device, while the locally unchangeable characters remain static. For authentication time (first authentication) the key is transmitted to the central database and compared with the key stored therein. In the central database, a string comprising of the numbers 1, 2, 3, 4, 5, 6 is stored. The digits 2, 3, 6 are centrally changeable, while the digits 1, 4, 5 are centrally unchangeable.

During or after authentication the centrally changeable characters are either left untouched, or reset as shown in this example. The centrally changeable characters 2, 3, 6 are, therefore, reset or re-elected here. As an example, the numerical values 2, 3, 6 are, for example, replaced by the number 0, so that the newly created sequence of numbers 1, 0, 0, 4, 5, 0 are known. This is transmitted as locally unchangeable string on the communication device and stored in this. Here, the numerals 1, 4, 5 would undergo dynamically continuous change in the communication device while the digits 0, 0, 0 remain locally unchangeable. Between the authentication time-points the locally changeable characters would undergo change in the communication device, i.e. from the numbers 1, 4, 5, for example, to the numbers 3, 6, 7. At the time of second authentication time, the total number sequence is retransmitted anew and compared with the string of the last authentication time-point stored in the central database. For a successful authentication and/or identification, the locally changeable characters 1, 4, 5, which are stored in the central database since the last authentication time, must have been changed. If these numbers are not changed, the authentication would have failed. Further, it would be necessary for a successful authentication that the locally unchangeable characters 0, 0, 0 in the central database correspond to a backup copy of centrally changeable characters 0, 0, 0 before any changes. Depending on the variant and safety profile only or additionally a partial conformity or non-conformity may be required with the central changeable characters, i.e. the balance can be carried out vaguely. Should one of these characters have been changed, then this could point to an unauthorized authentication attempt. A change could indicate that the local database, which numbers are unchangeable for it, has unknowingly changed some of the characters accidentally, but this would not be critical and would be fixed by resetting again.

Figure 3:
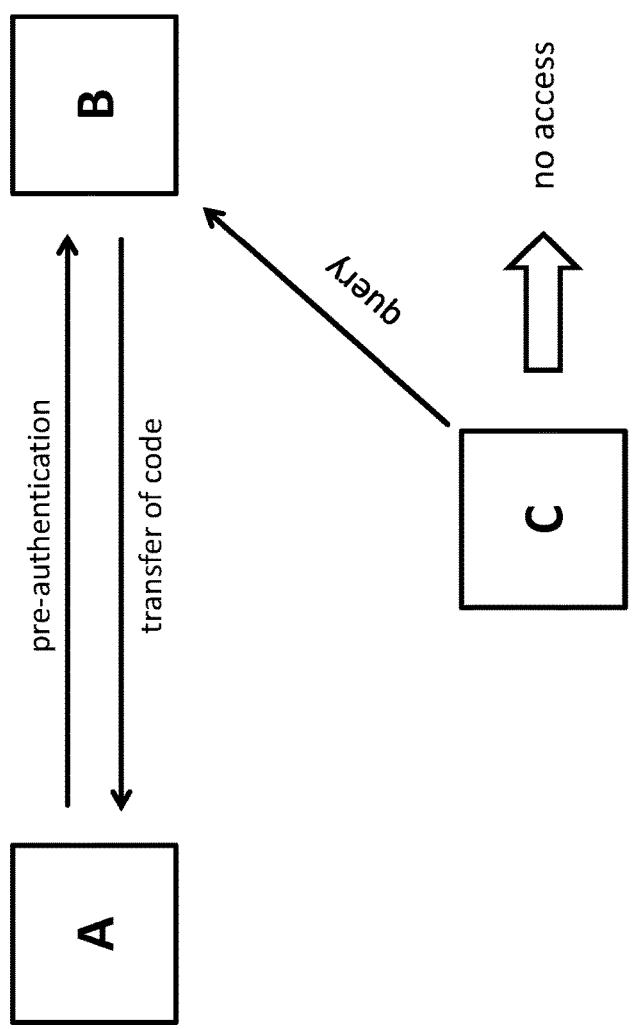

FIG. 3 shows an example of a pre-authentication between two users A, C and a central database B. Here A denotes the original, C an illegal copy and B the central database. As part of a pre-authentication a query is initiated from C to B, wherein a pre-authentication event is triggered between A and B. As part of the pre-authentication, an amended code (key) is transmitted from the central database B to the user A. Thus, A receives an updated key through B. Because the key in C has not changed, C gets no access during the actual authentication at B, because there is already the updated key of the previous authentication.

Figure 4:
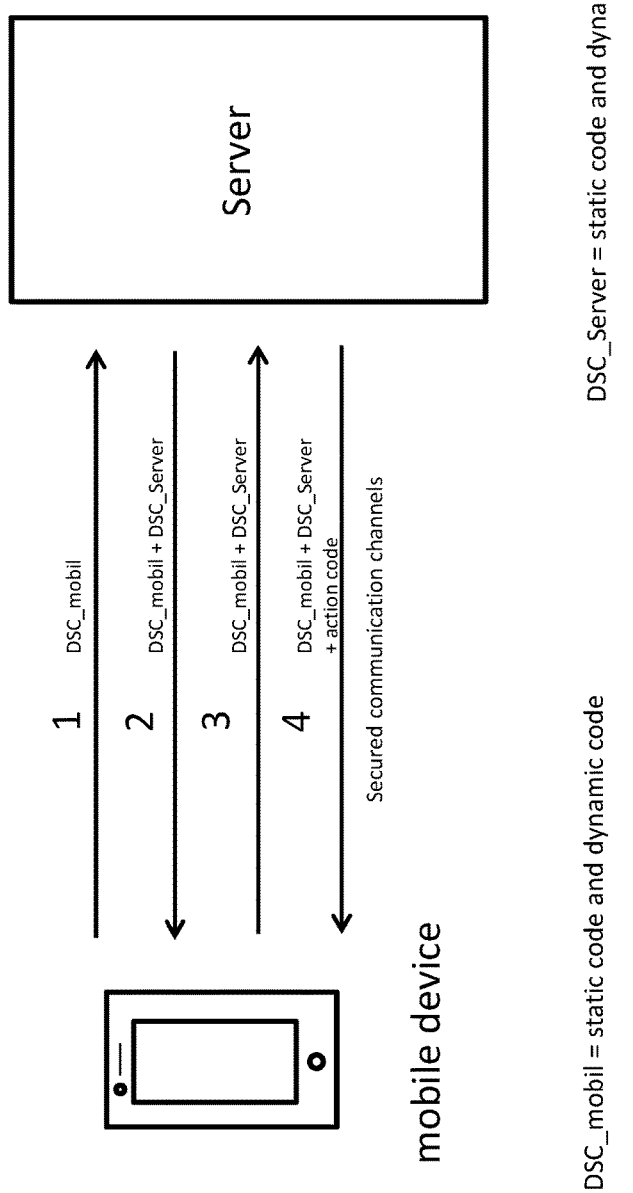

FIG. 4 shows a further example of the said method and its implementation in a communication network. In a first step, a dynamic security code comprising locally changeable characters and possibly static characters is transmitted from a mobile device to a server. The dynamic part of the code can depend, for example, on the battery charge status of the mobile device. The determination of charge level is done by a sensor device. The resulting state variable is the basis for the generation of dynamic code.

In a second step, a code is sent back from the server to the mobile device, wherein the security code from the security code of the mobile device (DSC_Mobil) transmitted in step 1 and a server-generated code (DSC_Server) exists. The server code is also made of dynamic characters and possibly static characters. The static characters may include, for example, an identification number to identify the device or person. In the third step, the mobile device builds up again a communication link to the server and sends its own security code (DSC_Mobil) and the security code (DSC_Server), just received from the server, to the server. In the fourth step, the server compares the received security code with the security codes received in the first step. In the fourth step, the server sends an action code together with both security codes (DSC_Mobil and DSC_Server) back to the mobile device. The latter compares the security codes with those security codes received in step 2. The action code is assigned a certain action and facilitates the user of the mobile device to undertake an action, such as making a payment or booking a service. In principle, this method works as a "double handshake", in which the dynamic DSCs are repeatedly transmitted to the subscribers and compared over different communication channels, wherein each DSC includes a variable component which is changeable either locally or only centrally based on a calculated measured variable (e.g. temperature, air pressure, GPS data, and charge level of the battery).

The invention claimed is:

1. A method for authentication and/or identification of a device, a service, a person and/or financial resources in a communication network, comprising of the steps:
   storing a first key in a communication device, the first key comprising:
      a first local string having at least one locally changeable character; and
      a set of locally unchangeable characters, the set of locally unchangeable characters comprising at least one of an unchangeable character within the first local string and a static local string;
   storing a second key in a central database, the second key comprising:
      a set of centrally changeable characters matching the set of locally unchangeable characters of the first key;
      a first central string having at least one centrally unchangeable characters, the at least one centrally unchangeable character mismatching at least a portion of the at least one locally changeable character of the first local string;
   transferring the first key stored in the communication device to the central database;
   comparing the second key stored in the central database to the first key stored in the communication device to determine a positive authentication, the positive authentication comprising:
      i. at least partially conformity of the set of locally unchangeable characters of the first key stored in the communication device with the set of centrally changeable characters of the second key stored in the central database;
      ii. at least a partial mismatch between the at least one locally changeable character of the first local string and the at least one centrally unchangeable character of the first central string;
   dynamically changing the at least one locally changeable character of the first local string, after determining the positive authentication, based on at least one of a measured variable, an algorithm depending on a measured variable, a rule and instructions stored on the communication device; and maintaining as static the set of locally unchangeable characters of the first key after determining the positive authentication.

2. The method according to claim 1, further comprising:
after determining the positive authentication and before maintaining as static the set of locally unchangeable characters of the first key, resetting the set of centrally changeable characters of the second key stored in the central database; and
after resetting the set of centrally changeable characters of the second key, transferring to the communication device the reset set of centrally changeable characters of the second key;
replacing the set of locally unchangeable characters of the first key stored in the communication device with the reset set of centrally changeable characters transferred to the communication;
replacing the at least one centrally unchangeable characters of the first central string with at least one locally changeable characters of the first local string of the first key stored in the communication device.

3. The method according to claim 1,
wherein the first key stored in the communication device further comprises a local identity determining string,
wherein the second key stored in the central database further comprises a central identify determining string, and
wherein a positive authentication further comprises at least partially matching the local identity string with the central identity string.

4. The method according to claim 1, further comprising replacing at least a portion of the at least one centrally unchangeable character of the first central string with at least a portion of the at least one changeable character of the first local string of the first key transferred from the communication device.

5. The method according to claim 1, wherein dynamically changing the at least one locally changeable character of the first local string is at least one of time-triggered, pulse-controlled, motion-dependent, location-dependent, time-dependent, temperature-dependent, vibration-dependent, value-dependent and service-specific dependent.

6. The method according to claim 1, wherein the at least one locally changeable character of the first local string of the first key stored in the communication device, comprises at least one of a letter, a number, a symbol and a figure.

7. The method according to claim 1, further comprising:
after determining the positive authentication and before maintaining as static the set of locally unchangeable characters of the first key, reassigning the first key stored in the communication device, the reassignment of the first key comprising at least one of maintaining as unchanged the set of locally unchangeable characters of the first key stored in the communication device and resetting the set of locally unchangeable characters of the first key stored in the communication device; and
after determining the positive authentication and before maintaining as static the set of locally unchangeable characters of the first key, reassigning the second key stored in the central database, the reassignment of the second key comprising at least one of maintaining as unchanged the at least on centrally unchangeable character of the first central string of the second key stored in the central database and resetting the at least on centrally unchangeable character of the first central string of the second key stored in the central database,
wherein the at least one locally changeable character of the first local string of the first key stored in the communication device comprises at least one of a character managed only in the communication device and a character managed only in the central database.

8. The method according to claim 1, wherein the at least one locally changeable character of the first local string of the first key stored on the communication device comprises a number sequence, and
wherein the communication device comprises a stored set of instructions, the stored set of instructions defining whether and how the number sequence constantly changes between two authentication time-points, the constant change comprising at least one of setting a number of the number sequence to a value, oscillating a number of the number sequence between two limits, increasing the number sequence and decreasing the number sequence.

9. The method according to claim 1, further comprising, after determining the positive authentication and before maintaining as static the set of locally unchangeable characters of the first key, resetting the set of locally unchangeable characters to comprise at least one of a last authentication time, a value of financial resources, a physical value, a position indication, a date, a differential value, a time-value, a cross-sum and a checksum.

10. The method according to claim 1, further comprising, after transferring the first key stored in the communication device to the central database, resetting the first local key, the resetting comprising at least one of modifying at least a portion of the first key and deleting the first key.

11. A method according to claim 1, wherein the first key stored in the communication device further comprises a first identity-determining string identifying at least one of the device, a service, a person and a financial resource,
wherein the second key further comprises a second identity-determining string, and
wherein positive authentication further comprises determining identity by matching the first identity determining string to the second identity determining string.

12. The method according to claim 1, further comprising, prior to comparing the second key stored in the central database to the first key stored in the communication device to determine a positive authentication, performing a pre-authentication, which is triggered by central database and leads to a change of the first key.

13. A method for authentication and/or identification of a device, a service, a person and/or financial resources in a communication network, comprising the following steps:
a. storing a first key in a central database, the first key comprising at least one central string, the at least one central string consisting of:
at least one centrally changeable character; and
a set of centrally unchangeable characters, the set of centrally unchangeable characters comprising at least one of an unchangeable character and a static central string;
b. storing a second key in a communication device, the second key comprising a local string, the local string consisting of:
a set of locally changeable characters matching at least a portion of the set of centrally unchangeable characters of the key;
at least one locally unchangeable character mismatching at least a portion of the at least one centrally changeable character of the first key;

c. transferring the second key stored in the communication device to the central database and comparing the first key stored in the central database to the second key stored in the communication device to determine a positive authentication, the positive authentication comprising:
i. at least partial conformity of the set of centrally unchangeable of the first key stored in the central database with the set of locally changeable characters of the second key stored in the communication device;
ii. at least a partial mismatch between the at least one centrally changeable of the first key stored in the central database and the at least one locally unchangeable character of the second key stored in the communication device,
e. dynamically changing the at least one centrally changeable character of the first key, after determining the positive authentication, based on at least one of a measured variable, an algorithm depending on a measured variable, a rule and instructions stored on the communication device; and
f. maintaining as static the set of locally unchangeable characters of the first key after determining the positive authentication.

14. The method as claimed in 13, further comprising:
after determining the positive authentication dynamically changing the set of locally changeable characters of the second key stored in the communication device based on at least one of a measured variable, an algorithm depending on a measured variable, a rule and instructions.

15. A method for authentication and/or identification of a device, a service, a person and/or financial resources in a communication network, comprising the following steps:
a. dynamically generating a first key based on at least one of a measured variable, an algorithm depending on a measured variable, a rule and instructions stored in a communication device, storing the first key from in the communication device:
b. dynamically generating a second key based on at least one of a measured variable, an algorithm depending on a measured variable, a rule and instructions stored in the communication device, and storing the second key in a central server;
c. performing an authentication query comprising the steps of:
i. transmitting the first key stored in the communication device to the central server via a first communication channel,
ii. after receiving the first key in the central server, transmitting the first key and the second key stored in the central server via a second communication channel to the communication device,
iii. checking whether the first key transmitted from the central server via the second communication channel matches the first key transmitted to the central server via the first communication channel, and if positive transmitting the first key and the second key via a third communication channel to the central server,
iv. checking whether the first key and the second central key transmitted via the third communication channel matches with the first key and second key transmitted via the second communication channel, and if positive transmitting the first key, the second key and an action code to the communication device via a fourth communication channel.

16. The method as claimed in 15, wherein at least one of the first communication channel, second communication channel, third communication channel and fourth communication is a secure, encrypted communication channel.

17. The method as claimed in 15, wherein dynamically generating the first key is based on at least one of a level of energy charge of the communication device and an algorithm depending the level of energy charge of the communication device.

18. The method as claimed in 15, wherein the central server is selected from the group comprising a mobile communication device, stationary communication device, and a portable communication device.

19. The method as claimed in 15, wherein the first key comprises a set of locally unchangeable characters, the set of locally unchangeable characters comprising at least one of an unchangeable character and a static string.

20. The method according to claim 19, wherein the set of centrally unchangeable characters comprise a static string, the static string comprising at least one of an identification number, a password and an attributable code.

21. The method according to claim 15, further comprising converting a portion of at least one of first key and second key into a set of static characters.

22. The method as claimed in 15, wherein the second key comprises a set of centrally unchangeable characters, the set of centrally unchangeable characters comprising at least one of an unchangeable character and a static string.

* * * * *